(12) United States Patent
Kurihara et al.

(10) Patent No.: US 7,961,429 B2
(45) Date of Patent: Jun. 14, 2011

(54) THIN-FILM MAGNETIC HEAD HAVING HEATING ELEMENT WITH LOWER-RESISTANCE PORTION

(75) Inventors: Katsuki Kurihara, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 1102 days.

(21) Appl. No.: 11/683,587

(22) Filed: Mar. 8, 2007

(65) Prior Publication Data
US 2008/0218909 A1 Sep. 11, 2008

(51) Int. Cl.
*G11B 5/31* (2006.01)
(52) U.S. Cl. .............. 360/125.31; 360/125.74
(58) Field of Classification Search .......... 360/125.31, 360/125.74
See application file for complete search history.

(56) References Cited

U.S. PATENT DOCUMENTS

| | | | | |
|---|---|---|---|---|
| 6,493,183 | B1 * | 12/2002 | Kasiraj et al. | 360/125.44 |
| 2004/0201920 | A1 * | 10/2004 | Koide et al. | 360/128 |
| 2005/0117242 | A1 * | 6/2005 | Taguchi | 360/59 |
| 2006/0103981 | A1 | 5/2006 | Kiyono et al. | |
| 2008/0019041 | A1 * | 1/2008 | Aoki | 360/110 |

FOREIGN PATENT DOCUMENTS

| | | |
|---|---|---|
| JP | 2002-56952 | 2/2002 |
| JP | 2004-335069 | 11/2004 |
| JP | 2005-56447 | 3/2005 |
| JP | 2006-53973 | 2/2006 |
| JP | 2006-351115 | 12/2006 |

* cited by examiner

*Primary Examiner* — Craig A. Renner
*Assistant Examiner* — Carlos E Garcia
(74) *Attorney, Agent, or Firm* — Oblon, Spivak, McClelland, Maier & Neustadt, L.L.P.

(57) ABSTRACT

Provided is a thin-film magnetic head having a heating element in which excessive increase in temperature is suppressed corresponding to smaller area of the shield layers of the MR effect element. The thin-film magnetic head comprises: an electromagnetic coil element; an MR effect element having two shield layers sandwiching an MR effect multilayer; and a heating element having a heating layer provided at least between the electromagnetic coil element and the MR effect element, and further in the head, at least a portion of a run-off portion of the heating layer running off the shield layer closer to the heating layer than the other shield layer has a resistance per unit length smaller than a resistance per unit length of the other portions than the portion running off the shield layer.

27 Claims, 8 Drawing Sheets

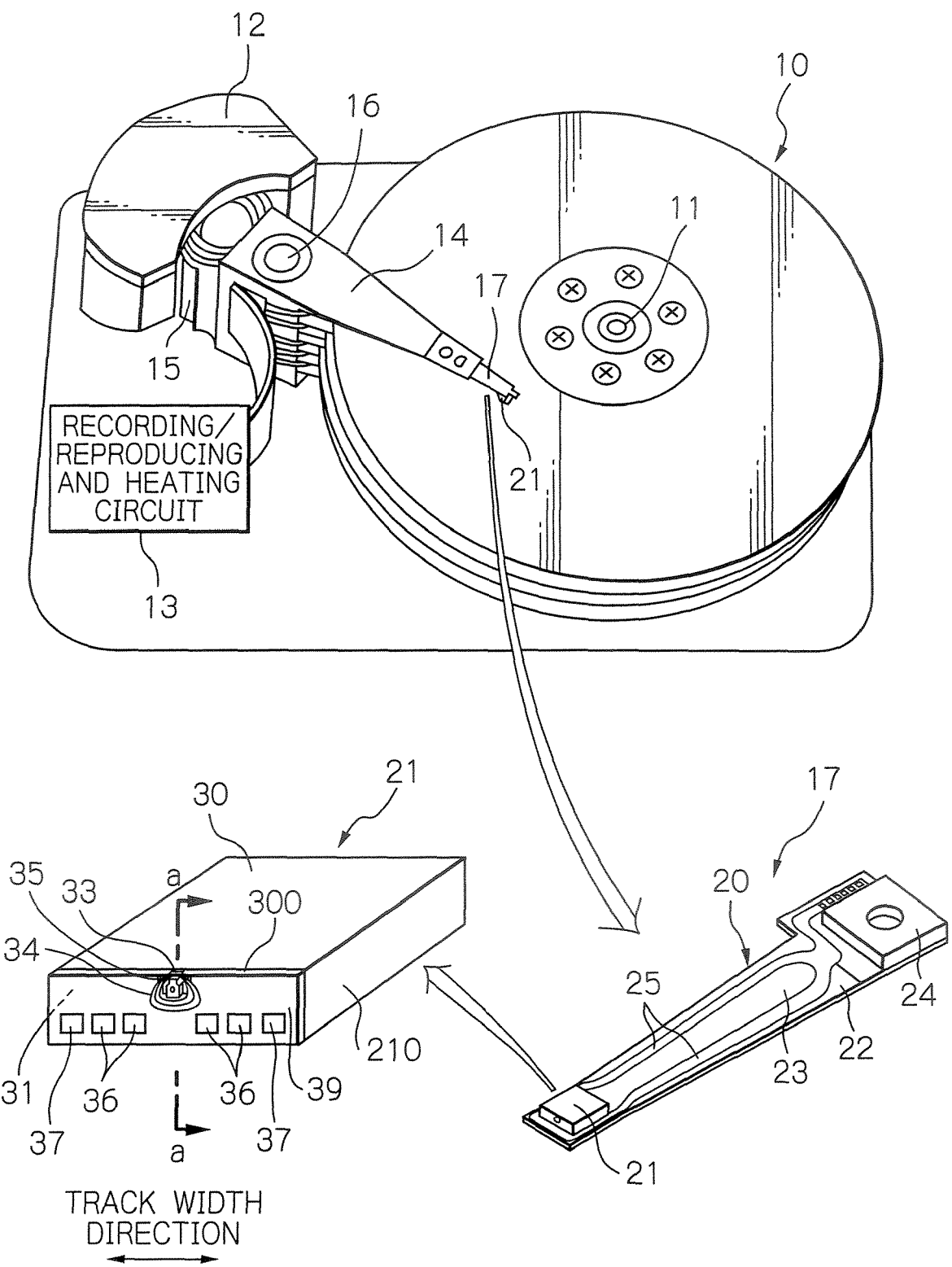

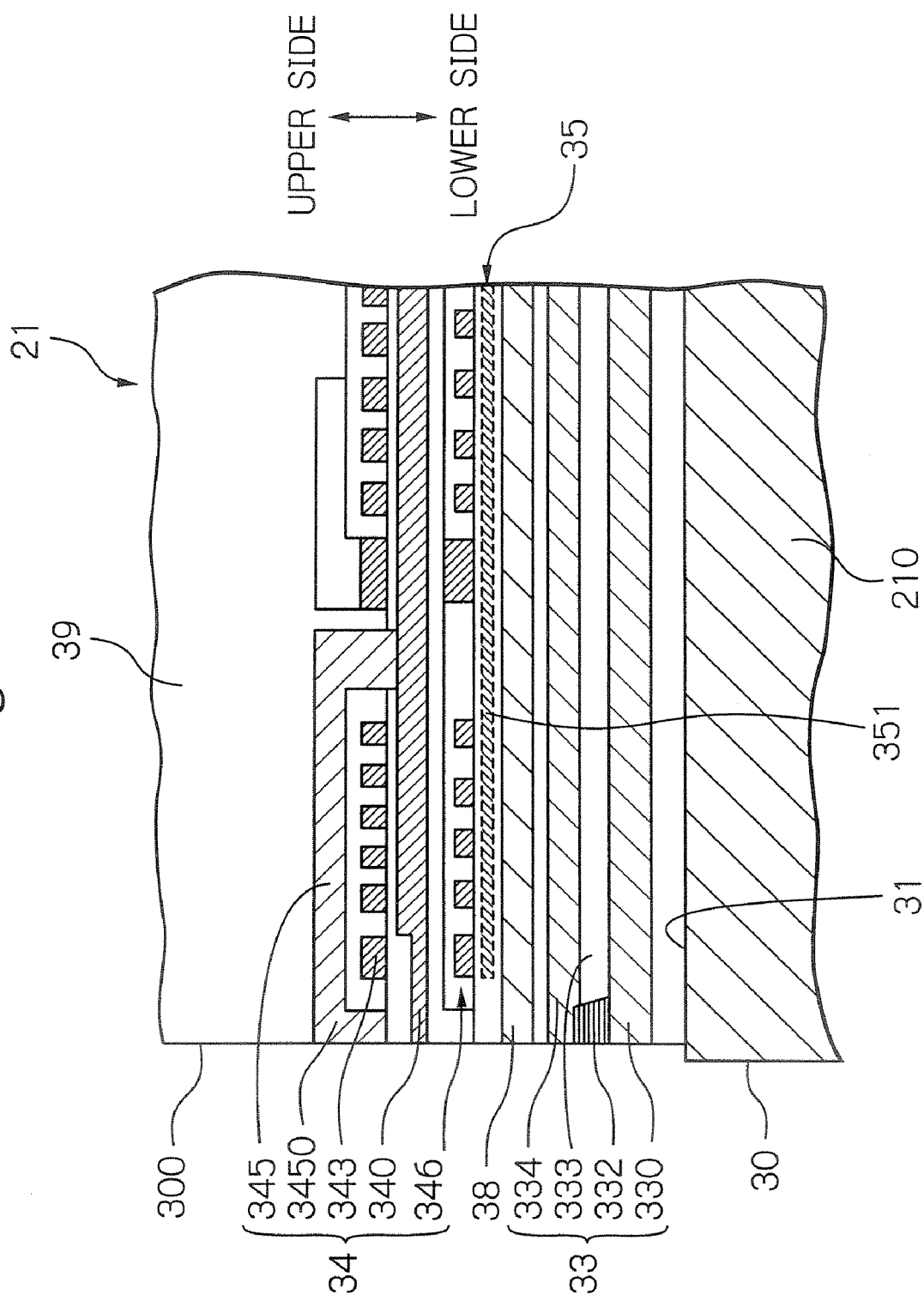

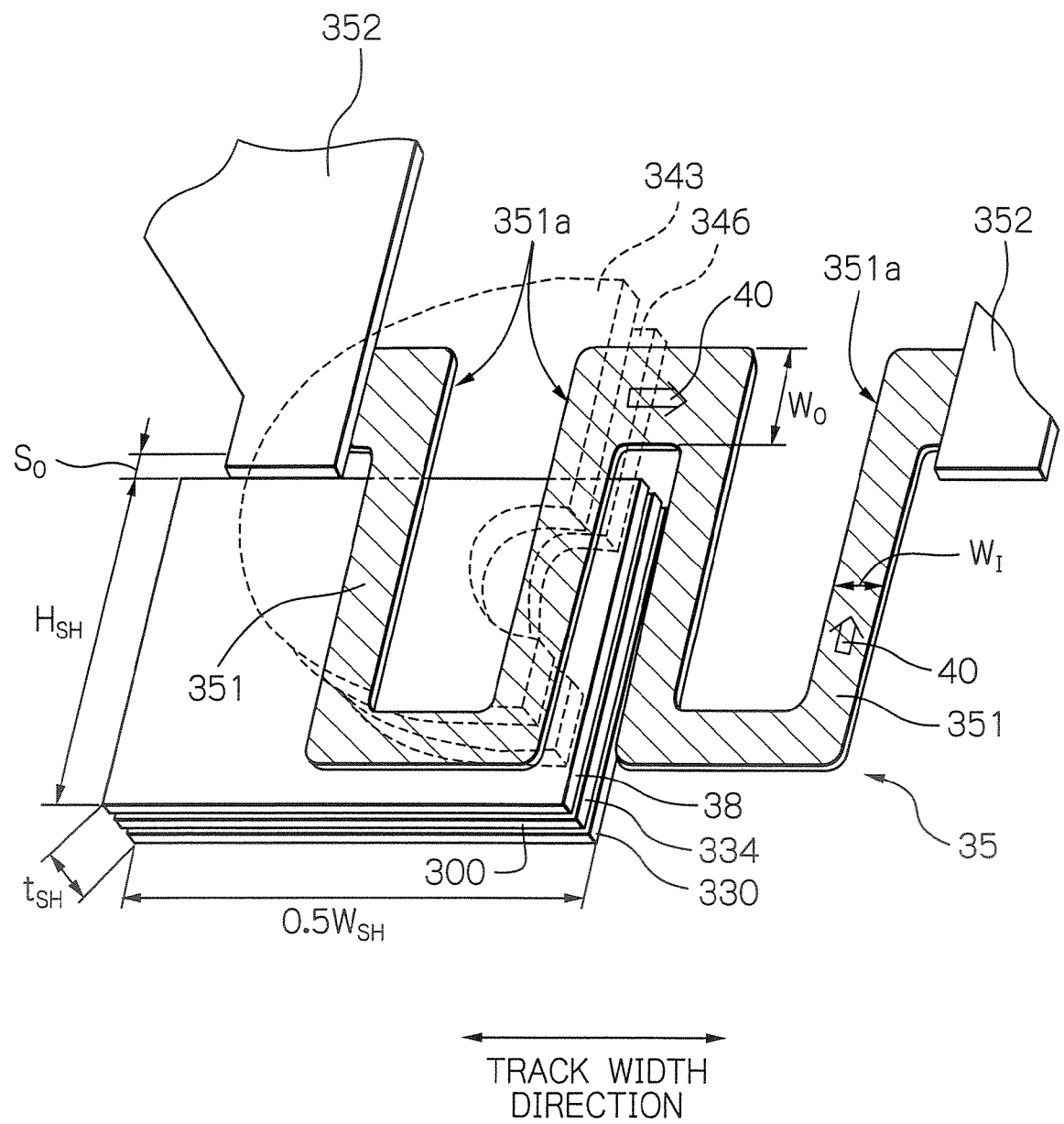

THIN-FILM MAGNETIC HEAD HAVING HEATING ELEMENT WITH LOWER-RESISTANCE PORTION

BACKGROUND OF THE INVENTION

1. Field of the Invention

The present invention relates to a thin-film magnetic head having a heating element for adjusting a flying height during write and read operations, a head gimbal assembly (HGA) provided with the thin-film magnetic head, and a magnetic disk drive apparatus provided with the HGA.

2. Description of the Related Art

In a magnetic disk drive apparatus, when writing or reading data signals, a thin-film magnetic head hydrodynamically flies with a predetermined spacing (flying height) on a rotating magnetic disk as a magnetic recording medium. While flying on the magnetic disk, the thin-film magnetic head writes data signals to the magnetic disk by applying signal magnetic fields with the use of an electromagnetic coil element, and reads data signals by sensing signal magnetic fields from the magnetic disk with the use of a magnetoresistive (MR) effect element.

With higher recording density due to the increase in data storage capacity and miniaturization of the magnetic disk drive apparatus in recent years, a track width of the thin-film magnetic head is becoming smaller. In order to avoid the degradation of writing and reading performances due to the smaller track width, latest magnetic disk drive apparatus actually has the flying height reduced down to the order of 10 nm or less.

The flying height, which shows such extremely small value, is required to be stably controlled, so as to avoid the thermal asperity and the crash and to maintain favorable read and write characteristics.

As a method for controlling the flying height, for example, U.S. Pat. No. 5,991,113 describes the developed technique for adjusting the flying height, in which a heater is provided within a thin-film magnetic head, and the ends of the electromagnetic coil element and the MR effect element are protruded toward the magnetic disk due to the heat generated from the heater.

In this technique, the effective protrusion of the element ends requires intensive heating of the intended region within the head. To meet the requirement, in Japanese patent Publication No. 2004-335069A, the sheet resistance of the heating portion of the heater is set to be larger than that of the lead portion, so that the amount of heat generated from the heater is set to be larger. Here, the sheet resistance is defined as a resistance $\rho/d$ in the case that the current flows in the length direction of a square-shaped sheet conductor having the length and width equal to each other, the thickness d, and the resistivity (specific resistance) $\rho$. Further, Japanese patent Publication No. 2002-56952A discloses the technique, though for the ceramic heater for water heating, in which the sheet resistance of the electrodes is set to be smaller than that of the heating resistor to improve the heat exchange efficiency.

Further, it shows a significant effect of improving the protrusion efficiency of these element ends that a heater is provided between the electromagnetic coil element and the MR effect element to heat both elements from the neighborhood of both elements. In the case, two shield layers, which is provided so as to sandwich the MR effect multilayer as a magneto-sensitive portion of the MR effect element, especially act as the heatsink of the heater, and play a role of avoiding disadvantages due to excessive increase in temperature, such as the deformation or breaking of the heater itself. Generally, the shield layer is formed of a magnetic metal, and has larger heat conductivity compared to the surrounding insulating portions. Therefore, the shield layer is suitable for the heatsink of the heater.

Meanwhile, for the purpose of improving the ability for sensing magnetic field, Current-Perpendicular-to-Plane giant magnetoresistive (CPP-GMR) effect elements or tunnel magnetoresistive (TMR) effect elements are lately being used as the MR effect element. These elements have two shield layers, which sandwich the MR effect multilayer and also act as electrodes. The two shield layers further sandwich an insulating layer provided to prevent sense currents from being short-circuited, which causes some stray capacitance to be generated. Because the stray capacitance is likely to cause the noise in the read output of the MR effect element, the area of the two shield layers is recently set to be smaller so that the stray capacitance is decreased as much as possible.

However, smaller area of the shield layers is likely to cause a portion of the heater to run (extend) off the shield layers. The run-off portion has no heatsink, and thus, is likely to excessively increase in temperature by its own heat. As a result, in some cases, the run-off portion may suffer disadvantages such as deformation or breaking, which leads to the problem of the stability and reliability of the heater. Recently, the need for low power consumption of the apparatus requires the total resistance of the heater to be larger, which forces the current path of the heater to become longer. Therefore, it becomes seriously difficult to prevent a portion of the heater from running off the shield layers.

As might be expected, in the case that Current-In-Plane giant magnetoresistive (CIP-GMR) effect elements are used as the MR effect element, the same problem as described above may occur because a portion of the heater is likely to run off the shield layers, as the area of the shield layers is becoming smaller due to the requirement of the head miniaturization.

BRIEF SUMMARY OF THE INVENTION

Therefore, an object of the present invention is to provide an thin-film magnetic head having a heating element in which excessive increase in temperature is suppressed corresponding to smaller area of the shield layers of the MR effect element, an HGA provided with the thin-film magnetic head, and a magnetic disk drive apparatus provided with the HGA.

Before describing the present invention, terms used herein will be defined. In a multilayer structure of element(s) formed on/above the element formation surface of the substrate in a thin-film magnetic head, a layer or a portion of the layer located on the substrate side (the element formation surface side) in relation to a standard layer is referred to as being located "lower" than, "beneath" or "below" the standard layer, and a layer or a portion of the layer located on the stacking direction side (the opposite side to the substrate) in relation to a standard layer is referred to as being located "upper" than, "on" or "above" the standard layer.

According to the present invention, a thin-film magnetic head is provided, which comprises:

an electromagnetic coil element for writing data;

an MR effect element for reading data having two shield layers sandwiching an MR effect multilayer; and a heating element having a heating layer provided at least between the electromagnetic coil element and the MR effect element, at least a portion of a run-off portion of the heating layer running off the shield layer closer to the heating layer than the other shield layer, having a resistance per unit length smaller than a resistance per unit length of the other portions than the portion running off the shield layer.

During the heating operation of the above-described heating element, the amount of heat generated from the run-off portion, which has a smaller resistance per unit length, becomes smaller. As a result, the excessive increase in temperature of the run-off portion can be suppressed, even in the case that the area of the shield layers of the MR effect element becomes smaller. Consequently, the deformation, breaking and so on of the heating layer can be avoided, which ensures the stability and reliability of the heating element.

In the thin-film magnetic head, the at least a portion of the run-off portion of the heating layer preferably has a width (width in the direction perpendicular to the pattern length along the current flow) larger than a width of the other portions than the run-off portion. Further, the at least a portion of the run-off portion of the heating layer also preferably has a thickness larger than a thickness of the other portions than the run-off portion. Furthermore, the at least a portion of the run-off portion of the heating layer also preferably has a ratio of a resistivity of constituent material and a cross-section area perpendicular to a current direction, which is larger than a ratio of a resistivity of constituent material and a cross-section area perpendicular to a current direction in the other portion than the run-off portion.

Further, in the thin-film magnetic head having the electromagnetic coil layer for perpendicular magnetic recording, it is also preferable that an inter-element shield layer is provided between the electromagnetic coil layer and the MR effect element, and the heating element is provided between the electromagnetic coil element and the inter-element shield layer.

Here, in the head structure including the inter-element shield layer, it is preferable that the inter-element shield layer has a larger area than an area of the shield layer closer to the heating layer than the other shield layer, and the heating layer is positioned in a region directly above the inter-element shield layer. And further, it is also preferable that the inter-element shield layer has a larger area than an area of the shield layer closer to the heating layer than the other shield layer, only at least one end portion of the heating layer runs off the inter-element shield layer, and the at least one end portion is overlapped with a lead layer for supplying a current to the heating layer. Here, the "end portion" of the heating layer includes each of both end portions as an inlet and an outlet of the current from/to the lead layers, and further, includes a tap portion when the tap (intermediate drawing terminal) is provided at some midpoints of heating layer. Further, being "overlapped with a lead layer" includes the situation of being covered with the lead layer.

Further, in the thin-film magnetic head according to the present invention, the MR effect element is preferably a TMR effect element.

According to the present invention, a head gimbal assembly is further provided, which comprises: the above-described thin-film magnetic head; signal lines for the electromagnetic coil element and the MR effect element; and a support means for supporting the thin-film magnetic head.

According to the present invention, a magnetic disk drive apparatus is further provided, which comprises; at least one head gimbal assembly described above; at least one magnetic recording medium; and a recording/reproducing and heating means for controlling read and write operations of the thin-film magnetic head to the at least one magnetic recording medium and for controlling heating operation of the heating element.

Further objects and advantages of the present invention will be apparent from the following description of preferred embodiments of the invention as illustrated in the accompanying figures. In each figure, the same element as that shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIG. 1 shows perspective views schematically illustrating a configuration of an embodiment of the magnetic disk drive apparatus, the HGA and the thin-film magnetic head according to the present invention;

FIG. 2 shows a cross-sectional view taken along line a-a in FIG. 1 schematically illustrating a main portion of the thin-film magnetic head;

FIG. 3 shows a perspective view illustrating the shape of the heating element;

DETAILED DESCRIPTION OF THE INVENTION

Figure 4A:
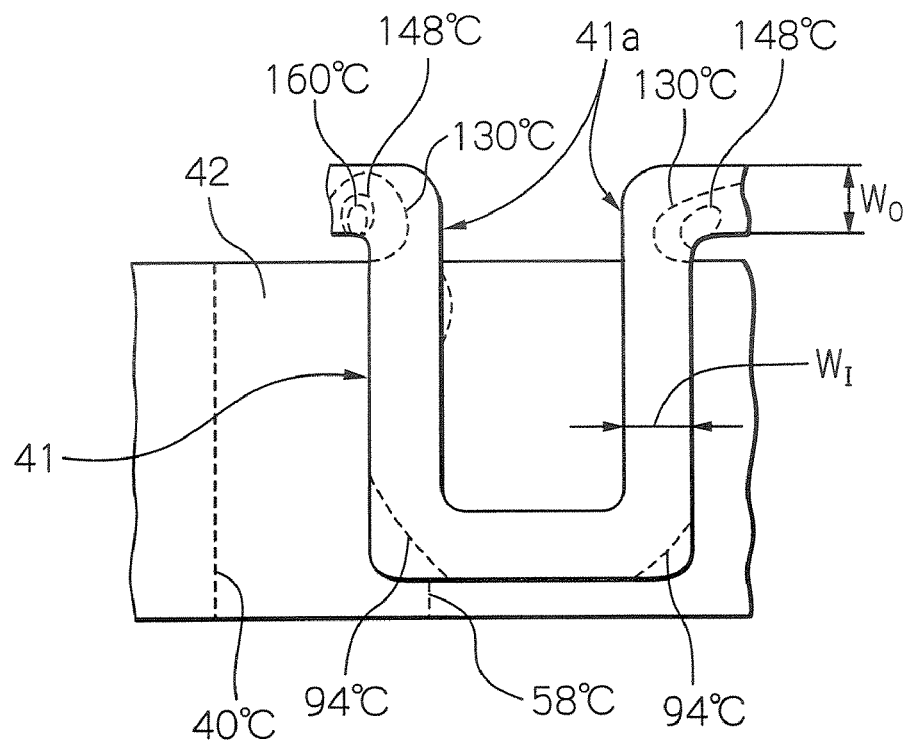
FIGS. 4a and 4b show simulation results explaining the effect of suppressing the excessive increase in temperature of the heating layer according to the present invention.

FIG. 1 shows perspective views schematically illustrating a configuration of an embodiment of the magnetic disk drive apparatus, the HGA and the thin-film magnetic head according to the present invention. In magnified views of the HGA and the thin-film magnetic head of FIG. 1, the side opposed to a magnetic disk is turned upward.

The magnetic disk drive apparatus shown in FIG. 1 includes multiple magnetic disks 10 as magnetic recording media that rotate about a spindle of a spindle motor 11, an assembly carriage device 12 provided with multiple drive arms 14, HGAs 17 each of which is attached on the end portion of each drive arm 14 and is provided with a thin-film magnetic head (slider) 21, and a recording/reproducing and heating circuit 13 for controlling read/write operations of the thin-film magnetic head 21 and heating operation of the heating element as described layer.

The assembly carriage device 12 is provided for positioning the thin-film magnetic head 21 above a track formed on the magnetic disk 10. In the device 12, the drive arms 14 are stacked along a pivot bearing axis 16 and are capable of angular-pivoting about the axis 16 driven by a voice coil motor (VCM) 15. The numbers of magnetic disks 10, drive arms 14, HGAs 17, and thin-film magnetic heads 21 may be one.

Also as shown in FIG. 1, in the HGA 17, the thin-film magnetic head 21 is fixed and supported on the end portion of a suspension 20 in such a way to face the surface of each magnetic disk 10 with a predetermined spacing (flying height). And one end of a wiring member 25 is electrically connected to electrodes of the thin-film magnetic head 21.

The suspension 20 includes a load beam 22, an flexure 23 with elasticity fixed on the load beam 22, a base plate 24 provided on the base portion of the load beam 22, and a wiring member 25 that is provided on the flexure 23 and consists of lead conductors as signal lines and connection pads electrically connected to both ends of the lead conductors. While not shown, a head drive IC chip may be attached at some midpoints of the suspension 20.

Also as shown in FIG. 1, the thin-film magnetic head 21 includes: a slider substrate 210 having an air bearing surface (ABS) 30 processed so as to provide an appropriate flying height and an element formation surface 31; an MR effect element 33 as a read head element for reading data and an electromagnetic coil element 34 as a write head element for writing data which are formed on/above the element formation surface 31; a heating element 35, at least a portion of which is positioned between the MR effect element 33 and the electromagnetic coil element 34, and which is provided for protruding each of the ends of the elements 33 and 34 toward the surface of the magnetic disk 10 due to their thermal expansion; an overcoat layer 39 formed so as to cover these elements; and four signal electrodes 36 and two drive electrodes 37 exposed in the upper surface of the overcoat layer 39. Here, the ABS 30 of the thin-film magnetic head 21 is opposed to the magnetic disk 10. Respective two of the four signal electrodes 36 are connected to the MR effect element 33 and the electromagnetic coil element 34. And two drive electrodes 37 are connected to the heating element 35.

The two drive electrodes 37 are disposed on both sides of a group of the four signal electrodes 36 respectively. The disposition can prevent a crosstalk between the wirings of the MR effect element 33 and the electromagnetic coil element 33. As a matter of course, when the generated crosstalk is within an allowed range, the two drive electrodes 37 may be disposed in intermediate positions among the four signal electrodes 36. The number and positions of the electrodes are not limited to the mode in FIG. 1. In the embodiment shown in FIG. 1, there are six electrodes, however it is also possible to provide five electrodes and a ground connecting to the slider substrate instead of the six electrodes.

One ends of the MR effect element 33 and the electromagnetic coil element 34 reach the head end surface 300 on the ABS 30 side. These ends face the surface of the magnetic disk 10, and then, a read operation is performed by sensing a signal magnetic field from the disk 10, and a write operation is performed by applying a write magnetic field to the disk 10. A predetermined area of the head end surface 300 that these ends reach may be coated with, for example, diamond like carbon (DLC) as an extremely thin protective film, for protecting against wear an break of the ends.

As described in detail layer, the heating element 35 is positioned between the MR effect element 33 and the electromagnetic coil element 34, and provided so that one end of the heating element 35 is in the vicinity of the head end surface 300. The MR effect element 33 and the electromagnetic coil element 34 are protruded toward the surface of the magnetic disk 10 in such a way that the head end surface 300 is swelled, due to the thermal expansion of the elements 33 and 34 themselves by the heat generated from the heating element 35, or due to the extrusion of the elements 33 and 34 by thermal expansion of the surrounding materials. By controlling the amount of the protrusion with adjusted applied powers to the heating element 35, the flying height can be controlled to a desired small value. Further, by providing the heating element 35 in the above-described position, the heat generated from the heating element 35 is directly conducted to the MR effect element 33 and the electromagnetic coil element 34. Therefore, the ends of the elements 33 and 34 can be efficiently protruded with less power.

FIG. 2 shows a cross-sectional view taken along line a-a in FIG. 1 schematically illustrating a main portion of the thin-film magnetic head 21. In the figure, the electromagnetic coil element 34 is for perpendicular magnetic recording. However, it may be an electromagnetic coil element for longitudinal magnetic recording, which has a write coil layer and upper and lower magnetic pole layers whose end portions on the head end surface side pinch a write gap layer.

In FIG. 2, the MR effect element 33 is a TMR effect element or a CPP-GMR effect element, and includes: an MR effect multilayer 332; an insulating layer 333 covering at least the rear side surface of the multilayer 332; and a lower shield layer 330 and an upper shield layer 334 which sandwich the MR effect multilayer 332 and the insulating layer 333. The MR effect multilayer 332 senses a signal magnetic field from the magnetic disk with very high sensitivity. The upper and lower shield layers 334 and 330 are formed of a soft-magnetic conductive material including, for example, NiFe (Permalloy), CoFeNi, CoFe, FeN or FeZrN with the thickness of approximately 0.3 to 5 μm (micrometers) by using, for example, a frame plating method or a sputtering method. The upper and lower shield layers 334 and 330 are electrodes for applying sense currents in the direction perpendicular to the stacked surface to the MR effect multilayer 332, and further play a role of shielding external magnetic fields that cause noise for the multilayer 332.

The MR effect multilayer 332 includes: an antiferromagnetic layer formed of an antiferromagnetic material; a magnetization-fixed layer (pinned layer) formed of a ferromagnetic material; a non-magnetic intermediate layer formed of an oxide layer (in the case of TMR effect element) or of a non-magnetic metal layer (in the case of CPP-GMR effect element); and a magnetization-freed layer (free layer) formed of a ferromagnetic material. In the case of the TMR effect element, the magnetizations of the pinned layer and the free layer make a ferromagnetic tunnel coupling with the non-magnetic intermediate layer as a barrier of tunnel effect. Thus, when the magnetization direction of the free layer changes in response to a signal magnetic field, a tunnel current increases/decreases due to the variation in the state densities of up and down spin bands of conduction electrons in the pinned layer and the free layer, which changes the electric resistance of the MR effect multilayer 332. The measurement of this resistance change enables a weak and local signal field to be detected with high sensitivity.

In addition, the MR effect element 33 may be a CIP-GMR effect element, and again can sense a signal magnetic field from the magnetic disk with extremely high sensitivity. In the case of the CIP-GMR effect element, though not shown in the figure, upper and lower shield gap layers for insulation are provided between the MR effect multilayer 332 and respective upper and lower shield layers 334 and 330. Further, also though not shown in the figure, MR lead conductor layers are formed for supplying the MR effect multilayer 332 with sense currents.

Especially, stable large output can be realized in the case using a TMR effect element as the MR effect element 33. In this embodiment, the heating element 35 is provided in the vicinity of the MR effect element 33, as described in detail later. Therefore, the temperature of the MR effect element 33 significantly increases due to the heat generated from the heating element 35. However, in the case using a TMR effect element as the MR effect element 33, the variation of the element output can be suppressed even when the element temperature significantly increases. The reason comes from the fact that the temperature coefficient of the resistance change due to tunnel currents flowing through an oxide (dielectric material) of the non-magnetic intermediate layer generally has a negative value, and further, the absolute value of the coefficient is at least one order of magnitude smaller, compared to the GMR effect which has a positive value of the coefficient corresponding to metallic conduction. As a result, the output variation can be suppressed under obtaining large element output by the TMR effect, and thus, excellent read performance can be realized stably.

The electromagnetic coil element 34 is for perpendicular magnetic recording in the present embodiment, and includes: a main magnetic pole layer 340 formed of a soft-magnetic material including, for example, NiFe (Permalloy), CoFeNi, CoFe, FeN or FeZrN; a write coil layer 343 formed of an conductive material such as Cu (copper); and an auxiliary magnetic pole layer 345 formed of a soft-magnetic material including, for example, NiFe (Permalloy), CoFeNi, CoFe, FeN or FeZrN. The main magnetic pole layer 340 is a magnetic path for converging and guiding a magnetic flux excited by write currents flowing through the write coil layer 343 toward the record layer of the magnetic disk 10. The length in the thickness direction (layer thickness) of the end portion on the head end surface 300 side of the main magnetic pole layer 340 becomes smaller than that of the other portions. As a result, the main magnetic pole layer 340 can generate fine write fields corresponding to higher density recording. The write coil layer 343 has a monolayer structure in the present embodiment, however, may have a two or more layered structure or a helical coil shape. Further, the number of turns of the write coil layer 343 is not limited to that shown in FIG. 2.

The end portion in the head end surface 300 side of the auxiliary magnetic pole layer 345 acts as a trailing shield portion 3450 that has a layer cross-section larger than that of the other portions. The trailing shield portion 3450 causes the magnetic field gradient between the end portion of the trailing shield portion 3450 and the end portion of the main magnetic pole layer 340 to be steeper. As a result, a jitter of signal outputs becomes smaller, and therefore, an error rate during reading can be reduced.

In the present embodiment, an inter-element shield layer 38 is provided between the MR effect element 33 and the electromagnetic coil element 34, which may be formed of the same material as the upper and lower shield layers 334 and 330. Further, the electromagnetic coil element 34 is provided with a backing coil portion 346 as well as the write coil layer 343. The backing coil portion 346 suppresses a wide area adjacent-track erase (WATE) behavior which is an unwanted write or erase operation to the magnetic disk, by generating a magnetic flux for negating the magnetic flux loop that arises from the main magnetic pole layer 340 through the upper and lower shield layers 334 and 330 of the MR effect element 33.

The heating element 35 is positioned between the MR effect element 33 and the electromagnetic coil element 34, and provided so that one end of the heating element 35 is in the vicinity of the head end surface 300. In the present embodiment, the heating element 35 is provided between the inter-element shield layer 38 and the electromagnetic coil element 34 (backing coil portion 346), however instead, may be provided between the MR effect element 33 (upper shield layer 334) and the inter-element shield layer 38. The heating element 35 includes a heating layer 351 and lead layers 352 (as shown in FIG. 3 later) which are electrically connected with the heating layer 351 for applying heating currents to the heating layer 351. An appropriate foundation layer may be provided as a ground of the heating layer 351. The heating layer 351 is preferably formed of a metal including, for example, NiCu, NiCr, Ta, W, Ti, Cu, Au or NiFe with a thickness of approximately 10 nm (nanometers) to 1 μm by using, for example, a sputtering method. The lead layer (FIG. 3) may be formed of the same material as the heating layer 351.

FIG. 3 shows a perspective view illustrating the shape of the heating element 35. The perspective view is obtained when viewing the element formation surface 31 of the slider substrate 210 from the obliquely upward. In the figure, shown are only one sides of the shield layers and the write coil layer when bounded by the symmetry plane of the head perpendicular to the head end surface 300, for viewability.

As shown in FIG. 3, the heating layer 351 of the heating element 35 is a pattern of current path in which one line meanders within a plane parallel with the element formation surface 31. Both ends in the track width direction of the heating layer 351 are connected to one ends of the lead layers 352, respectively. The other ends of the lead layers 352 are connected to the two drive electrodes 37 respectively, though not shown in the Figure. The heating layer 351 generates heat by receiving an electric power for heating from the heating circuit. The shape of the heating layer 351 is not limited to such a rectangular one, and may be linear, U-shaped or spiral.

The heating layer 351 having the above-described pattern of current path includes portions 351a running off the upper shield layer 334 positioned closer to the heating layer 351 than the other shield layer 330. In the present embodiment, the run-off portions 351a also run (extend) off the lower shield layer 330 and the inter-element shield layer 38. The run-off portions 351a are caused by the requirement to decrease the area of the upper and lower shield layers 334 and 330 for the noise reduction, as described above. The portions other than the run-off portions 351a (not-run-off portions) are positioned directly above the upper shield layer 334. The upper shield layer 334 (and the lower shield layer 330) acts as a heatsink for the not-run-off portions. As a result, the excessive increase in temperature of the not-run-off portions is suppressed. Further, in the present invention, the inter-element shield layer 38 also acts as a heatsink.

On the contrary, the run-off portions 351a have no heatsink directly below them. However, a portion of the run-off portions 351a, extended along the track width direction in the present embodiment, has a width $W_0$ larger than the width $W_1$ of the not-run-off portions. That is to say, at least a portion of the run-off portions 351a (the portions with the width $W_0$ in the present embodiment) has a resistance value per unit length smaller than that of the not-run-off portions (the portions with the width $W_1$). In the present embodiment, the layer thickness of the run-off portions 351a is the same as that of the not-run-off portions. However, the layer thickness may be different under the condition that satisfied is the above-described relation about the resistance values per unit length. By using the above-described constitutions, the amount of heat generated from the portions with the width $W_0$ becomes smaller, thus, the excessive increase in temperature of the run-off portions 351a can also be suppressed. As a result, the deformation, breaking and so on of the heating layer 351 can be avoided, which ensures the stability and reliability of the heating element 35.

The resistance of the whole heating element 35 is required not to be reduced as much as possible to maintain the high heating efficiency. In the present invention, the reduction only of at least a portion of the heating-layer portions running off the shield layers can meet the requirement.

Further, the case will be considered in which the electromagnetic coil element is for longitudinal magnetic recording, and at least a portion of the heating element (heating layer) is provided between the MR effect element and the electromagnetic coil element. Even in the case, as is the case with the above embodiment, at least a portion of the heating-layer portions running off the shield layer is set to have a resistance value per unit length smaller than that of the not-run-off portions. By the setting, the excessive increase in temperature of the run-off portions can also be suppressed. As a result, the deformation, breaking and so on of the heating layer can be avoided, which ensures the stability and reliability of the heating element.

Figure 4B:
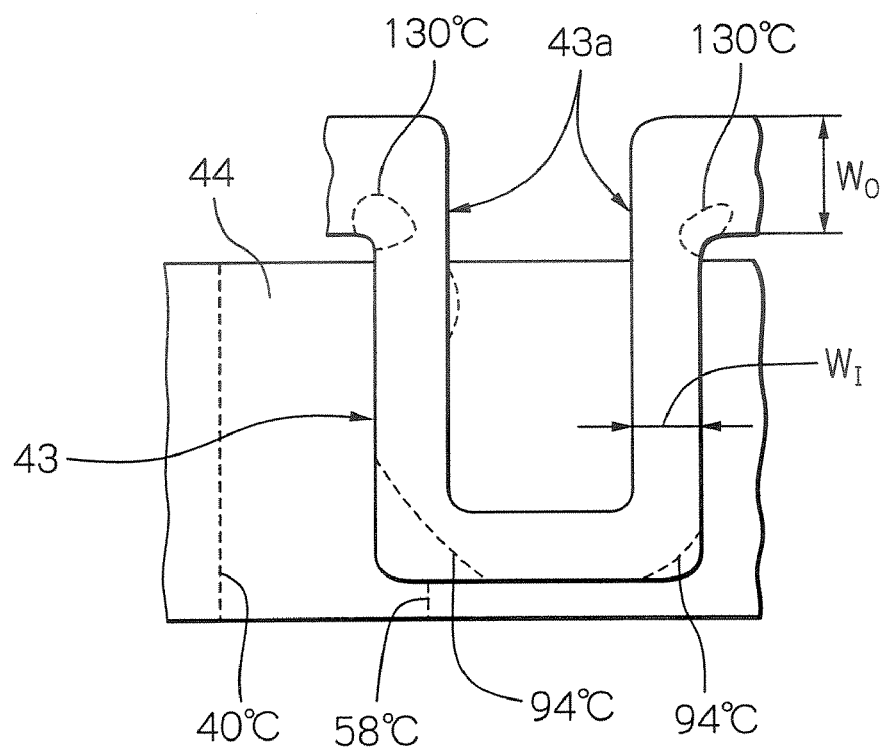

FIGS. 4a and 4b show simulation results explaining the effect of suppressing the excessive increase in temperature of the heating layer according to the present invention. FIG. 4a is the result in the simulation case that the width $W_O$ of the run-off portions of the heating layer was 3.4 µm which was the same as the width $W_I$ of the not-run-off portions, and FIG. 4b is the result in the simulation case that the width $W_O$ was 5.9 µm which was 1.74 times larger than the width $W_I$ (3.4 µm). In both simulation cases, the layer thickness of the heating layer was 111 nm, the resistivity of the constituent material was 50 µΩcm, the distance between the heating layer and the inter-element shield layer was 0.2 µm, and the supplied power was 100 mW (milliwatts).

As shown in FIG. 4a, in the case that the width $W_O$ is equal to the width $W_I$, the temperature increase of the portions 41a, which run off the shield layer 42, of the heating layer 41 becomes larger due to nonexistence of a heatsink, compared to the other portions. Especially, the temperature of the inward of the bend section in the run-off portions 41a becomes excessively high. The maximum value of the inward position reaches 168.3° C. On the other hand, as shown in FIG. 4b, by setting the width $W_O$ to be larger than the width $W_I$, the temperature increase of the inward of the bend section in the portions 43a, which run off the shield layer 44, of the heating layer 43 is sufficiently suppressed. In fact, the maximum value is reduced to 141.2° C. Consequently, it is understood that, by setting the resistance value per unit length of the portions running off the shield layers to be smaller than that of the not-run-off portions, the excessive increase in temperature can be suppressed even in the run-off portions.

FIGS. 5a to 5d show perspective views schematically illustrating alternatives of the heating element in the thin-film magnetic head according to the present invention. These figures are perspective views when viewing the element formation surface 31 of the slider substrate 210 from obliquely upward of the surface 31. In each of FIGS. 5a to 5d, shown are only the left sides in the track width direction of the shield layers and the heating layer, for viewability.

Figure 5A:
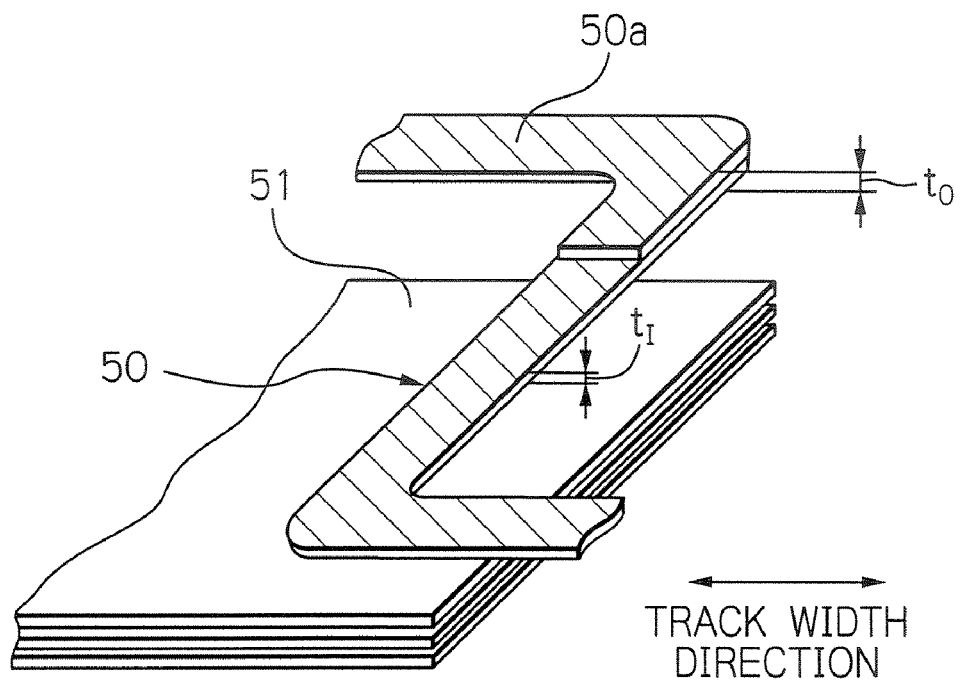
FIGS. 5a to 5d show perspective views schematically illustrating alternatives of the heating element in the thin-film magnetic head according to the present invention.

According to FIG. 5a, in the heating layer 50, a portion of the portion 50a running off the shield layer 51 has a thickness to larger than a thickness $t_I$ of the not-run-off portion. That is, the resistance per unit length of at least a portion of the run-off portions 50a is set to be smaller than that of the not-run-off portions. In the present embodiment, the width of the run-off portion 50a is equal to that of the not-run-off portion, however, may be set to be different from that instead, under the condition of satisfying the above-described relation about the resistances per unit length. Further, the portion with the thickness to of the run-off portion 50a may have a layered structure in which a layer formed of the same constituent material, or preferably of a material with lower resistivity, is stacked on the layer pattern continuing into the not-run-off portion. Furthermore, the portion with the thickness to may be provided by leaving the portion while etching the not-run-off portion (and a portion continuing from it) of the heating layer 351 in a certain degree.

Figure 5B:
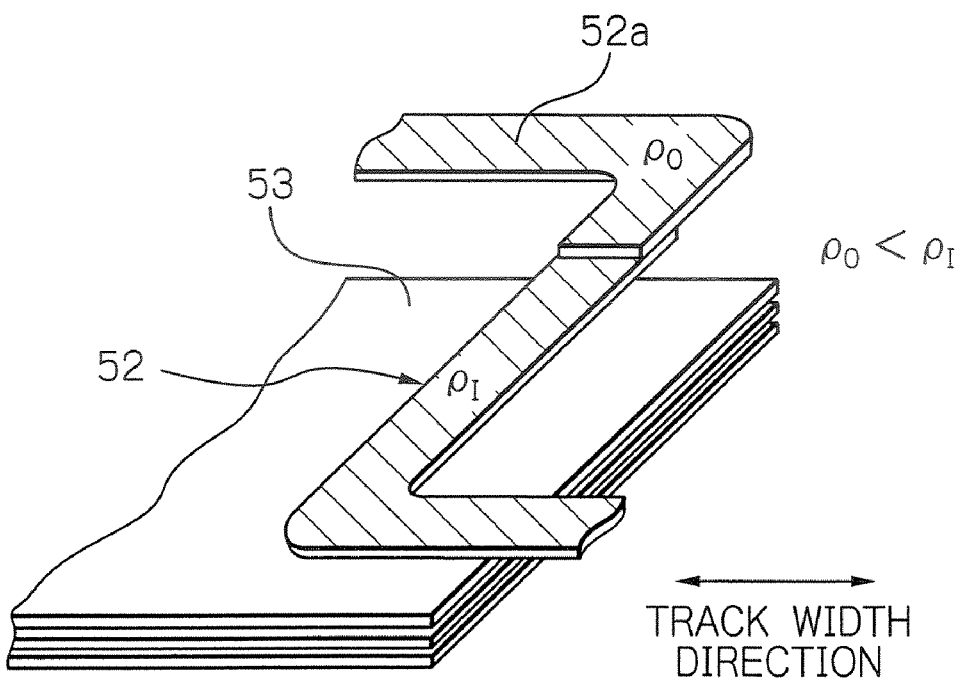

According to FIG. 5b, in the heating layer 52, a portion of the portion 52a running off the shield layer 53 has a resistivity $\rho_o$ lower than a resistivity $\rho_I$ of the not-run-off portion. Generally, in the rectangular solid having a length l, a cross-section area S, a resistance R in the length direction when currents flow in the length direction, and a resistivity ρ of the constituent material of the solid, the resistance per unit length R/l equals to ρ/S. Therefore, in the heating layer 52, the ratio of the resistivity $\rho_0$ of the constituent material and the cross-section area perpendicular to the current direction in at least a portion of the run-off portion 52a (which is equivalent to the resistance per unit length) becomes smaller than the ratio of the resistivity $\rho_I$ of the constituent material and the cross-section area perpendicular to the current direction in the not-run-off portion (which is also equivalent to the resistance per unit length). In the present embodiment, the width and thickness of the run-off portion 52a are equal to those of the not-run-off portion, however, may be different from those instead, under the condition of satisfying the above-described relation of the ratio of the cross-sectional area and the resistivity of the constituent material.

As described above, the excessive increase in temperature of the heating layer 50 (FIG. 5a) and the heating layer 52 (FIG. 5b) can also be suppressed. As a result, the deformation, breaking and so on of the heating layers can be avoided, which ensures the stability and reliability of the heating elements.

According to FIG. 5c, the area of the layer surface of the inter-element shield layer 58 is larger than that of the upper and lower shield layers 57 and 56, and thus, the heating layer 55 does not run off the inter-element shield layer 58 positioned directly below the heating layer 55. That is, the heating layer 55 is positioned in the region directly above the inter-element shield layer 58. As a result, the whole heating layer 55 lies down according to the flat and smooth layer surface of the inter-element shield layer 58, which facilitates the formation of the heating layer 55 without steps. Therefore, the breaking of the heating layer 55 and the short-circuiting between the heating layer 55 and the inter-element shield layer 38 can be further reliably avoided.

However, the heating layer 55 has portions 55a running off the upper and lower shield layers 57 and 56, as the case of the heating layer 351 shown in FIG. 3. Generally, the inter-element shield layer is required to be as thin as possible on the condition to act a shield, so as not to protrude toward the surface of the magnetic disk by the thermal expansion due to environmental temperature. Actually, the thickness of the inter-element shield layer may be considered preferably to be approximately 0.1 µm. Therefore, the heat release effect of the inter-element shield layer 58 for the heating layer 55 becomes rather little. Consequently, in the heating layer 55, the heat release of the portions 55a running off the upper and lower shield layers 57 and 56 become problematic.

As a measure against the problem, a portion of the run-off portions 55a (the portion extending along the track width direction in the present embodiment) has a width $W_O$ larger than a width $W_I$ of the not-run-off portion. That is, the portion of the run-off portions 55a (the portion with the width $W_O$ in the present embodiment) has a resistance per unit length smaller than that of the not-run-off portion with the width $W_I$. Therefore, the amount of heat generated from the portion with the width $W_O$ becomes smaller, and thus, the excessive increase in temperature of the run-off portions 55a can be suppressed. As a result, the deformation, breaking and so on of the heating layer 55 can be avoided, which ensures the stability and reliability of the heating element.

Figure 5C:
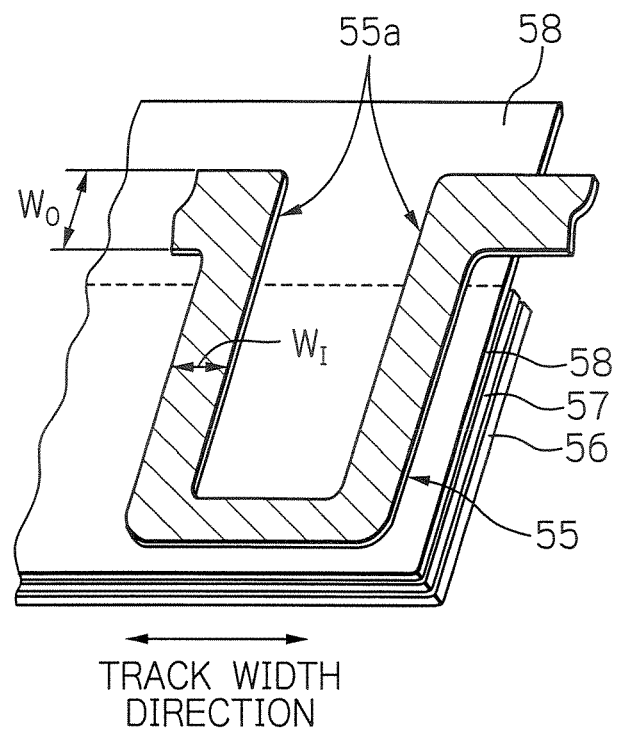

As further alternatives to FIG. 5c, the thickness of at least a portion of the run-off portions 55a may become larger, or the ratio of the resistivity of the constituent material and the cross-section area perpendicular to the current direction of at least a portion of the run-off portions 55a may become smaller. In these alternatives, it is just required that the resistance per unit length of the run-off portions 55a is smaller than that of the not-run-off portion.

Figure 5D:
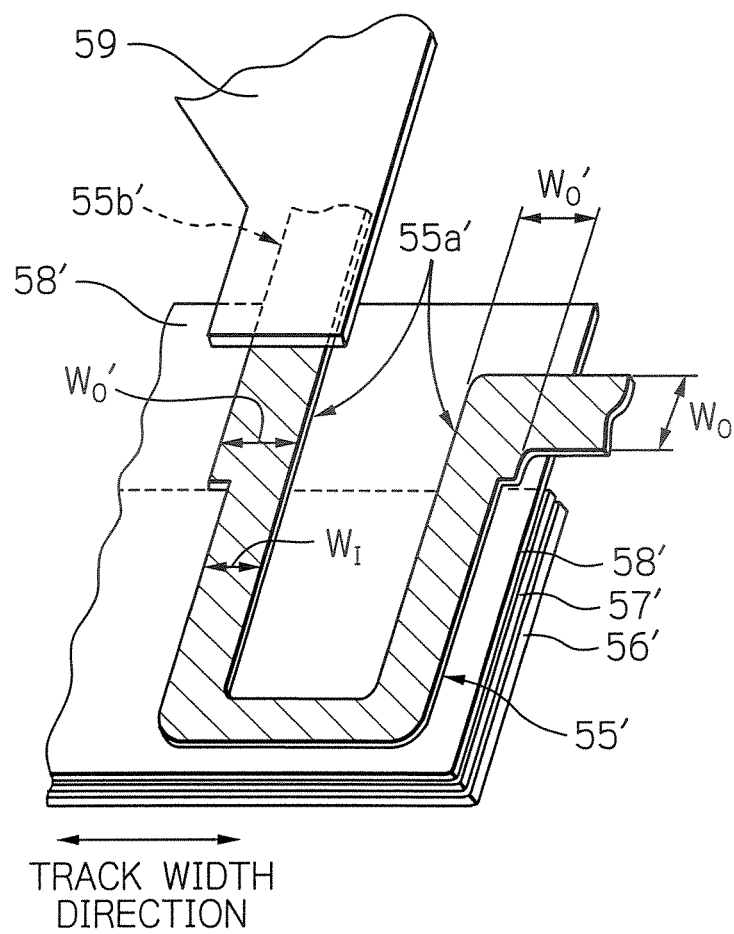

According to FIG. 5d, the area of the layer surface of the inter-element shield layer 58' is larger than that of the upper and lower shield layers 57' and 56' as the case shown in FIG. 5c. And the heating layer 55' has portions 55a' running off the upper and lower shield layers 57' and 56'. In the run-off portions 55a', the portion extending along the track width direction has a width $W_O$ larger than a width $W_I$ of the not-run-off portion. Further, in this alternative, the portion extending perpendicularly to the track width direction also has a width $W_O'$ larger than the width $W_I$, and thus, the resistance per unit length of the run-off portions 55a' becomes smaller.

However, in FIG. 5d, the end portion 55b' of the heating layer 55' runs off the inter-element shield layer 58'. The portions other than the end portion 55b' does not run off the layer 58'. Further, at least the end portion 55b' of the heating layer 55' is overlapped and electrically connected with a lead layer 59. The end portion 55b' may be covered with the lead layer 59, and here, being "overlapped" includes the "covered" situation. In the present alternative, the lead layer 59 is also overlapped with a portion of the not-run-off portion continuing into the end portion 55b'. Here, the heating layer 55' with the end portion 55b' extends across the edge of the inter-element shield layer 58', which generates a possibility of the deformation, breaking or the like of the heating layer 55' at the step across the edge. Nevertheless, in the present alternative, the step is inevitably overlapped (covered) with the lead layer 59, and therefore, the power for heating can be stably supplied to the heating layer 55' through the lead layer 59, even in the case that the deformation, breaking or the like occurs at the step. Meanwhile, in FIG. 5d, shown are only the left side in the track width direction of the heating layer 55', however, the right side may be the same structure and shape as the left side.

Figure 6:
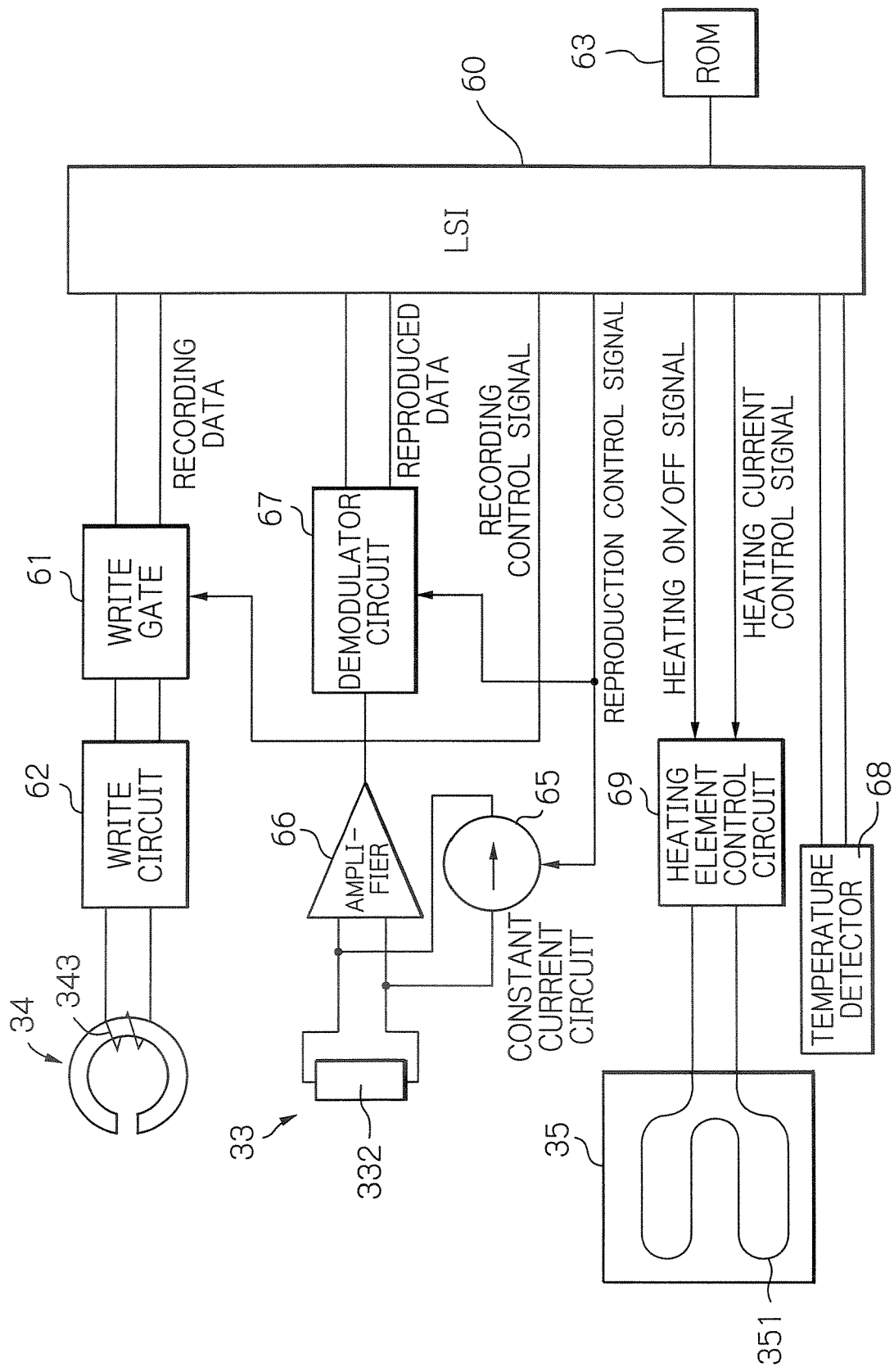
FIG. 6 shows a block diagram illustrating a circuitry of an embodiment of the recording/reproducing and heating circuit of the magnetic disk drive apparatus shown in FIG. 1.

FIG. 6 shows a block diagram illustrating a circuitry of an embodiment of the recording/reproducing and heating circuit 13 of the magnetic disk drive apparatus shown in FIG. 1.

In FIG. 6, reference numeral 60 indicates a control LSI, 61 indicates a write gate, 62 indicates a write circuit, 63 indicates a ROM for storing a control table and so on for controlling current values applied to the heating element 35, 65 indicates a constant current circuit for supplying sense currents to the MR effect element 33, 66 indicates an amplifier for amplifying the output voltage of the MR effect element 33, 67 indicates a demodulator circuit for outputting reproduced data to the LSI 60, 68 indicates a temperature detector, and 69 indicates a heating control unit for controlling the heating element 35, respectively.

The record data that is output from the control LSI 60 is supplied to the write gate 61. The write gate 61 supplies the record data to the write circuit 62 only when a recording control signal that is output from the control LSI 60 instructs a write operation. Then, the write circuit 62 passes write currents corresponding to the record data through the write coil layer 343, and thus, the electromagnetic coil element 34 writes data signals on the magnetic disk.

On the other hand, constant currents flow from the constant current circuit 65 to the MR effect multilayer 332 only when the reproduction control signal that is output from the control LSI 60 instructs a read operation. The data signals read by the MR effect element 33 is amplified by the amplifier 66, and then demodulated by the demodulator circuit 67. After that, the obtained reproduced data are output to the control LSI 60.

The heating control unit 69 receives a heating ON/OFF signal and a heating current control signal that are output from the control LSI 60. When the heating ON/OFF signal is an ON operation instruction, currents for heating flow into the heating layer 351 of the heating element 35. The current value is controlled to a value corresponding to the heating current control signal. The control LSI 60 determines the values of the heating ON/OFF signal and the heating current control signal based on the state of read/write operations, the temperature value measured by the temperature detector 78, and so on. It becomes possible to realize more diversified current application modes, as well as the current application to the heating element 35 in conjunction with the read/write operations, by providing the above system with the heating ON/OFF signal and the heating current control signal, independently from the recording/reproducing control signal system.

It is evident that the circuit structure of the recording/reproducing and heating circuit 13 is not limited to that shown in FIG. 6. For example, it is possible to specify the read and write operations using signals other than the recording/reproducing control signal. The heating operation by using the heating element 35 is preferably performed during both reading and writing operations, however, the heating operation may be performed only when either reading or writing operation, or only in a predetermined period. Furthermore, it is possible to use not only direct current (DC) but also alternate current (AC) or pulse current, etc., as a current applied to the heating element 35.

Hereinafter, explained will be the effect of suppressing the temperature increase in the heating layer according to the present invention, by using practical examples.

Figure 7:
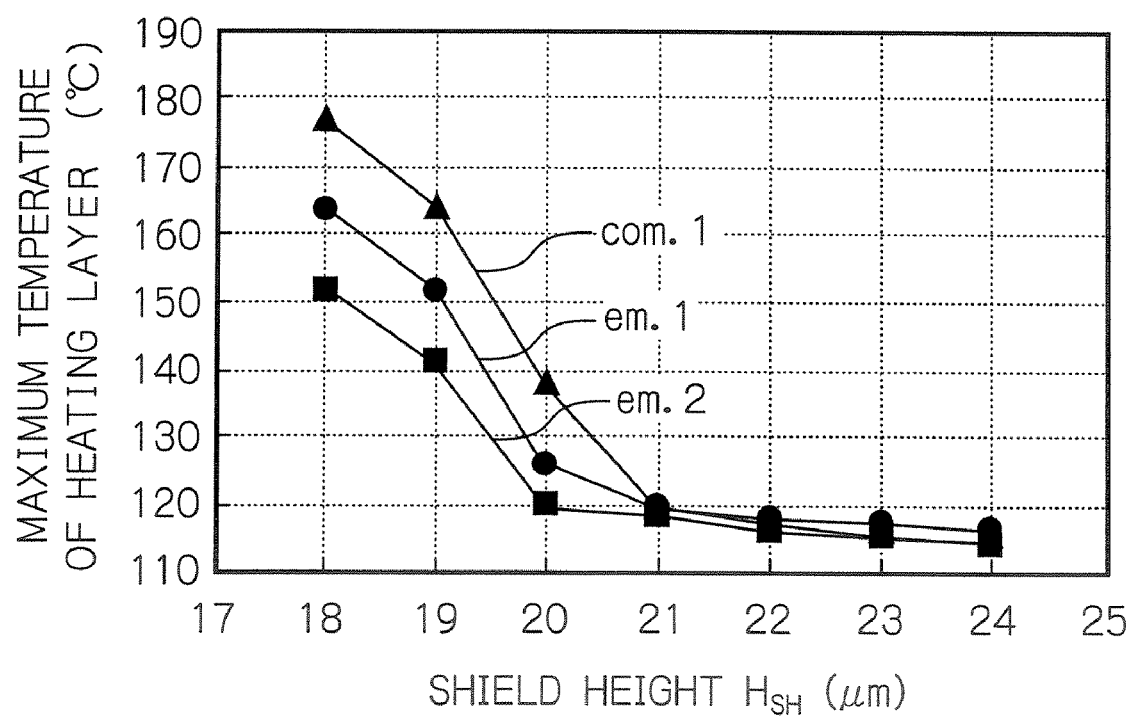
FIG. 7 shows a graph illustrating the result of the simulation of the temperature change in the heating layer when the height of the shield layers is decreased.

FIG. 7 shows a graph illustrating the result of the simulation of the temperature change in the heating layer when the height of the shield layers is decreased.

For the practical examples of the simulation, the structure shown in FIG. 3 was used, and there, a distance $S_O$ was 1.6 μm, which is the distance between the edge in the track width direction on the head end surface 300 side of the run-off portion of the heating layer and the edges in the track width direction opposite to the head end surface 300 of the upper and lower shield layers 334 and 330 (and the inter-element shield layer 38). The width $W_I$ was 3.4 μm. A width $W_{SH}$ in the track width direction of the upper and lower shield layers 334 and 330 (and the inter-element shield layer 38) was 65 μm (0.5 $W_{SH}$=32.5 μm), and a distance (thickness) $t_{SH}$ from the bottom surface of the lower shield layer 330 to the top surface of the inter-element shield layer 38 was 4 μm.

As the comparative example, a model was used, in which the width $W_O$ equals to the width $W_I$ (=3.4 μm) in the structure shown in FIG. 3. In practical example 1, the width $W_O$ was 1.2 times larger than the width $W_I$ ($W_O$=1.2×$W_I$=4.08 μm), and in practical example 2, the width $W_O$ was 1.5 times larger than the width $W_I$ ($W_O$=1.5×$W_I$=5.1 μm). Further, the layer thickness of the heating layer was 111 nm, the resistivity of the constituent material was 50 μΩcm, the distance between the heating layer and the inter-element shield layer 38 was 0.2 μm, and the supplied power was 100 mW. Further, in the simulation, the length (shield height) $H_{SH}$ in the direction perpendicular to the head end surface 330 of the upper and lower shield layers 334 and 330 (and the inter-element shield layer 38) was decreased from 24 μm to 18 μm.

According to FIG. 7, as the shield height $H_{SH}$ is more decreased from 24 μm, so the maximum temperature of the heating layer is being more increased from the shield height value approximately underrunning 21 μm, in each of the comparative example, practical example 1 and practical example 2 (com. 1, ex. 1 and ex. 2). The comparative example (com. 1) has a steep gradient of the temperature increase, and shows larger maximum temperature of 177° C. at $H_{SH}$=18 µm. On the contrary, practical examples 1 and 2 (ex. 1 and ex. 2) have rather moderate gradients of the temperature increase, and therefore, the maximum temperatures at $H_{SH}$=18 µm are 164° C. and 151° C. respectively, which shows that the temperature increase is sufficiently suppressed in practical examples 1 and 2.

From the above-described results, it is understood that, by setting the resistance per unit length of the heating-layer portion running off the shield layers to be smaller than that of the not-run-off portion, the excessive increase in temperature of the heating layer can be suppressed, even in the case that the shield layers have a smaller size.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
an electromagnetic coil element for writing data;
a magnetoresistive effect element for reading data having two shield layers sandwiching a magnetoresistive effect multilayer; and
a heating element including:
  (1) a heating layer forming a current path pattern, provided at least between said electromagnetic coil element and said magnetoresistive effect element, and configured to protrude by thermal expansion said electromagnetic coil element and said magnetoresistive effect element to control a flying height of the head; and
  (2) lead layers electrically connected with said heating layer for applying a heating current to said heating layer,
at least a portion of a run-off portion midway in the current path pattern of said heating layer running off the shield layer closer to said heating layer than the other shield layer, having a resistance per unit length smaller than a resistance per unit length of the other portions than the portion running off the shield layer.

2. The thin-film magnetic head as claimed in claim 1, wherein said at least a portion of the run-off portion of said heating layer has a width larger than a width of the other portions than the run-off portion.

3. The thin-film magnetic head as claimed in claim 1, wherein said at least a portion of the run-off portion of said heating layer has a thickness larger than a thickness of the other portions than the run-off portion.

4. The thin-film magnetic head as claimed in claim 1, wherein said at least a portion of the run-off portion of said heating layer has a ratio of a resistivity of constituent material and a cross-section area perpendicular to a current direction, which is larger than a ratio of a resistivity of constituent material and a cross-section area perpendicular to a current direction in the other portion than the run-off portion.

5. The thin-film magnetic head as claimed in claim 1, wherein said electromagnetic coil layer is for perpendicular magnetic recording, an inter-element shield layer is provided between said electromagnetic coil layer and said magnetoresistive effect element, and said heating element is provided between said electromagnetic coil element and said inter-element shield layer.

6. The thin-film magnetic head as claimed in claim 5, wherein said inter-element shield layer has a larger area than an area of the shield layer closer to said heating layer than the other shield layer, and said heating layer is positioned in a region directly above said inter-element shield layer.

7. The thin-film magnetic head as claimed in claim 5, wherein said inter-element shield layer has a larger area than an area of the shield layer closer to said heating layer than the other shield layer, only at least one end portion of said heating layer runs off said inter-element shield layer, and said at least one end portion is overlapped with a lead layer for supplying a current to said heating layer.

8. The thin-film magnetic head as claimed in claim 1, wherein said magnetoresistive effect element is a tunnel magnetoresistive effect element.

9. The thin-film magnetic head as claimed in claim 1, wherein one end of said heating layer is recessed from a head end surface opposed to a magnetic recording medium, the one end being on the head end surface side.

10. A head gimbal assembly comprising a thin-film magnetic head comprising:
an electromagnetic coil element for writing data;
a magnetoresistive effect element for reading data having two shield layers sandwiching a magnetoresistive effect multilayer; and
a heating element including:
  (1) a heating layer provided at least between said electromagnetic coil element and said magnetoresistive effect element, and configured to protrude by thermal expansion said electromagnetic coil element and said magnetoresistive effect element to control a flying height of the head; and
  (2) lead layers electrically connected with said heating layer for applying a heating current to said heating layer,
at least a portion of a run-off portion midway in the current path pattern of said heating layer running off the shield layer closer to said heating layer than the other shield layer, having a resistance per unit length smaller than a resistance per unit length of the other portions than the portion running off the shield layer, and
said head gimbal assembly further comprising: signal lines for said electromagnetic coil element and said magnetoresistive effect element; and a support means for supporting said thin-film magnetic head.

11. The head gimbal assembly as claimed in claim 10, wherein said at least a portion of the run-off portion of said heating layer has a width larger than a width of the other portions than the run-off portion.

12. The head gimbal assembly as claimed in claim 10, wherein said at least a portion of the run-off portion of said heating layer has a thickness larger than a thickness of the other portions than the run-off portion.

13. The head gimbal assembly as claimed in claim 10, wherein said at least a portion of the run-off portion of said heating layer has a ratio of a resistivity of constituent material and a cross-section area perpendicular to a current direction, which is larger than a ratio of a resistivity of constituent material and a cross-section area perpendicular to a current direction in the other portion than the run-off portion.

14. The head gimbal assembly as claimed in claim 10, wherein said electromagnetic coil layer is for perpendicular magnetic recording, an inter-element shield layer is provided between said electromagnetic coil layer and said magnetoresistive effect element, and said heating element is provided between said electromagnetic coil element and said inter-element shield layer.

15. The head gimbal assembly as claimed in claim 14, wherein said inter-element shield layer has a larger area than an area of the shield layer closer to said heating layer than the other shield layer, and said heating layer is positioned in a region directly above said inter-element shield layer.

16. The head gimbal assembly as claimed in claim 14, wherein said inter-element shield layer has a larger area than an area of the shield layer closer to said heating layer than the other shield layer, only at least one end portion of said heating layer runs off said inter-element shield layer, and said at least one end portion is overlapped with a lead layer for supplying a current to said heating layer.

17. The head gimbal assembly as claimed in claim 10, wherein said magnetoresistive effect element is a tunnel magnetoresistive effect element.

18. The head gimbal assembly as claimed in claim 10, wherein one end of said heating layer is recessed from a head end surface opposed to a magnetic recording medium, the one end being on the head end surface side.

19. A magnetic disk drive apparatus comprising at least one head gimbal assembly comprising a thin-film magnetic head comprising:
an electromagnetic coil element for writing data;
a magnetoresistive effect element for reading data having two shield layers sandwiching a magnetoresistive effect multilayer; and
a heating element including:
(1) a heating layer provided at least between said electromagnetic coil element and said magnetoresistive effect element, and configured to protrude by thermal expansion said electromagnetic coil element and said magnetoresistive effect element to control a flying height of the head; and
(2) lead layers electrically connected with said heating layer for applying a heating current to said heating layer,
at least a portion of a run-off portion midway in the current path pattern of said heating layer running off the shield layer closer to said heating layer than the other shield layer, having a resistance per unit length smaller than a resistance per unit length of the other portions than the portion running off the shield layer,
said head gimbal assembly further comprising: signal lines for said electromagnetic coil element and said magnetoresistive effect element; and a support means for supporting said thin-film magnetic head, and said magnetic disk drive apparatus further comprising: at least one magnetic recording medium; and a recording/reproducing and heating means for controlling read and write operations of said thin-film magnetic head to said at least one magnetic recording medium and for controlling heating operation of said heating element.

20. The magnetic disk drive apparatus as claimed in claim 19, wherein said at least a portion of the run-off portion of said heating layer has a width larger than a width of the other portions than the run-off portion.

21. The magnetic disk drive apparatus as claimed in claim 19, wherein said at least a portion of the run-off portion of said heating layer has a thickness larger than a thickness of the other portions than the run-off portion.

22. The magnetic disk drive apparatus as claimed in claim 19, wherein said at least a portion of the run-off portion of said heating layer has a ratio of a resistivity of constituent material and a cross-section area perpendicular to a current direction, which is larger than a ratio of a resistivity of constituent material and a cross-section area perpendicular to a current direction in the other portion than the run-off portion.

23. The magnetic disk drive apparatus as claimed in claim 19, wherein said electromagnetic coil layer is for perpendicular magnetic recording, an inter-element shield layer is provided between said electromagnetic coil layer and said magnetoresistive effect element, and said heating element is provided between said electromagnetic coil element and said inter-element shield layer.

24. The magnetic disk drive apparatus as claimed in claim 23, wherein said inter-element shield layer has a larger area than an area of the shield layer closer to said heating layer than the other shield layer, and said heating layer is positioned in a region directly above said inter-element shield layer.

25. The magnetic disk drive apparatus as claimed in claim 23, wherein said inter-element shield layer has a larger area than an area of the shield layer closer to said heating layer than the other shield layer, only at least one end portion of said heating layer runs off said inter-element shield layer, and said at least one end portion is overlapped with a lead layer for supplying a current to said heating layer.

26. The magnetic disk drive apparatus as claimed in claim 19, wherein said magnetoresistive effect element is a tunnel magnetoresistive effect element.

27. The magnetic disk drive apparatus as claimed in claim 19, wherein one end of said heating layer is recessed from a head end surface opposed to the magnetic recording medium, the one end being on the head end surface side.

* * * * *